(12) United States Patent
Jacobs et al.

(10) Patent No.: US 10,120,836 B2
(45) Date of Patent: Nov. 6, 2018

(54) GATHERING MATERIALS ON THE OCEAN SURFACE BASED ON FORECASTING AREA DENSITY

(71) Applicants: Gregg Arthur Jacobs, Slidell, LA (US); A. D. Kirwan, Jr., Newark, DE (US); Helga S. Huntley, Newark, DE (US); Bruce L. Lipphardt, Jr., Newark, DE (US)

(72) Inventors: Gregg Arthur Jacobs, Slidell, LA (US); A. D. Kirwan, Jr., Newark, DE (US); Helga S. Huntley, Newark, DE (US); Bruce L. Lipphardt, Jr., Newark, DE (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 364 days.

(21) Appl. No.: 15/043,251

(22) Filed: Feb. 12, 2016

(65) Prior Publication Data
US 2016/0246903 A1 Aug. 25, 2016

Related U.S. Application Data

(60) Provisional application No. 62/115,291, filed on Feb. 12, 2015.

(51) Int. Cl.
*G06F 17/13* (2006.01)
(52) U.S. Cl.
CPC .......... *G06F 17/13* (2013.01); *B63B 2211/02* (2013.01)

(58) Field of Classification Search
CPC .............................. B63B 2211/02; G06F 17/13
See application file for complete search history.

(56) References Cited

U.S. PATENT DOCUMENTS 8,949,096 B2 * 2/2015 Jolliff .................. G06F 17/5018
703/9
2014/0372088 A1 * 12/2014 Suk ......................... G06F 17/13
703/2

OTHER PUBLICATIONS

Lebreton, L.C., et al. "Numerical Modelling of Floating Debris in the World's Oceans" Marine Pollution Bulletin, vol. 64, pp. 653-661 (2012) (Year: 2012).*

(Continued)

*Primary Examiner* — Jay Hann
(74) *Attorney, Agent, or Firm* — US Naval Research Laboratory; Scott G. Bell

(57) ABSTRACT

Embodiments relate to gathering materials on an ocean surface. Initially, an initial distribution of material is determined based on observational sources, and the material is represented by particles in a numerical ocean model. Trajectories for the numerical ocean model are determined based on modeled surface currents data, and velocity gradients are computed along a corresponding trajectory of the trajectories for each of the particles based on the initial distribution. At this stage, deformation tensors are computed for each of the particles based on the velocity gradients, and a dilation map for the particles is generated based on a time step tensor of the plurality of deformation tensors for each of the particles. Collection of the material is monitored based on the dilation map.

9 Claims, 6 Drawing Sheets
(4 of 6 Drawing Sheet(s) Filed in Color)

(56) References Cited

OTHER PUBLICATIONS

Dominicis, M., et al. "MEDSLIK-II, a Lagrangian marine surface oil spill model for short-term forecasting—Part 1: Theory" Geoscientific Model Development, vol. 6, pp. 1851-1869 (2013) (Year: 2013).*

Mariano, A.J., et al. "On the Modelling of the 2010 Gulf of Mexico Oil Spill" Dynamics of Atmospheres & Oceans, vol. 52, pp. 322-340 (2011). (Year: 2011).*

Huntley, H., et al. "Clusters, Deformation, and Dilation: Diagnostics for Material Accumulation Regions" J. Geophysical Research: Oceans, vol. 120, pp. 6622-6636 (2015) (Year: 2015).*

Galt, J., et al. "Current Pattern Analysis for Oil-Spills—A Case Study Using San Francisco Bay" Oceans '97. MTS/IEEE Conference Proceedings, vol. 2, pp. 1448-1452 (1997) available from <http://ieeexplore.ieee.org/document/624210/?arnumber=624210>. (Year: 1997).*

Huntley, H., et al. "Surface Drift Predictions of the Deepwater Horizon Spill: The Lagrangian Perspective" Monitoring and Modeling the Deepwater Horizon Oil Spill: A Record-Breaking Enterprise, pp. 179-195 (2013) (Year: 2013).*

Manu "GPS Navigation and Its Use on Board Ships" <https://www.brighthubengineering.com/seafaring/23017-gps-navigation-and-its-use-on-board-ships/> (2009) (Year: 2009).*

Barron, C. N., A. B. Kara, P. J. Martin, R. C. Rhodes, and L. F. Smedstad (Feb. 15, 2005), Formulation, implementation and examination of vertical coordinate choices in the Global Navy Coastal Ocean Model (NCOM), Ocean Model, 11(3-4), pp. 347-375.

Egbert, G. D., and S. Y. Erofeeva (Feb. 2002), Efficient inverse modeling of barotropic ocean tides, J Atmos Ocean Tech, 19(2), pp. 183-204.

Hodur, R. M. (Jul. 1997), The Naval Research Laboratory's coupled ocean/atmosphere mesoscale prediction system (COAMPS), Mon Weather Rev, 125(7), pp. 1414-1430.

Kalda, J., T. Soomere, and A. Giudici (Sep. 12, 2012), On the finite-time compressibility of the surface currents in the Gulf of Finland, the Baltic Sea, J Marine Syst, 129, pp. 56-65.

Metzger, E., O. Smedstad, P. Thoppil, H. Hurlburt, J. Cummings, A. Wallcraft, L. Zamudio, D. Franklin, P. Posey, and M. Phelps others. (Sep. 2014). US Navy operational global ocean and Arctic ice prediction systems, Oceanography, 27(3), pp. 32-43.

* cited by examiner

GATHERING MATERIALS ON THE OCEAN SURFACE BASED ON FORECASTING AREA DENSITY

CROSS-REFERENCE TO RELATED APPLICATIONS

This Application is a non-provisional application claiming priority to provisional application 62/115,291 filed on Feb. 12, 2015, under 35 USC 119(e). The entire disclosure of the provisional application is incorporated herein by reference.

BACKGROUND

Current methods for gathering material on the ocean surface consist of detection, by in situ and remote means, the distribution of material on the ocean surface. Ocean model forecasts can determine the location to which the material would move or be moved by the ocean currents. Such forecasts can be used to identify locations at which resources could be directed to gather material.

SUMMARY

Embodiments relate to gathering materials on an ocean surface. Initially, an initial distribution of material is determined based on observational sources, and the material is represented by particles in a numerical ocean model. Trajectories for the numerical ocean model are determined based on modeled surface currents data, and velocity gradients are computed along a corresponding trajectory of the trajectories for each of the particles based on the initial distribution. At this stage, deformation tensors are computed for each of the particles based on the velocity gradients, and a dilation map for the particles is generated based on a time step tensor of the plurality of deformation tensors for each of the particles. Collection of the material is monitored based on the dilation map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 1:
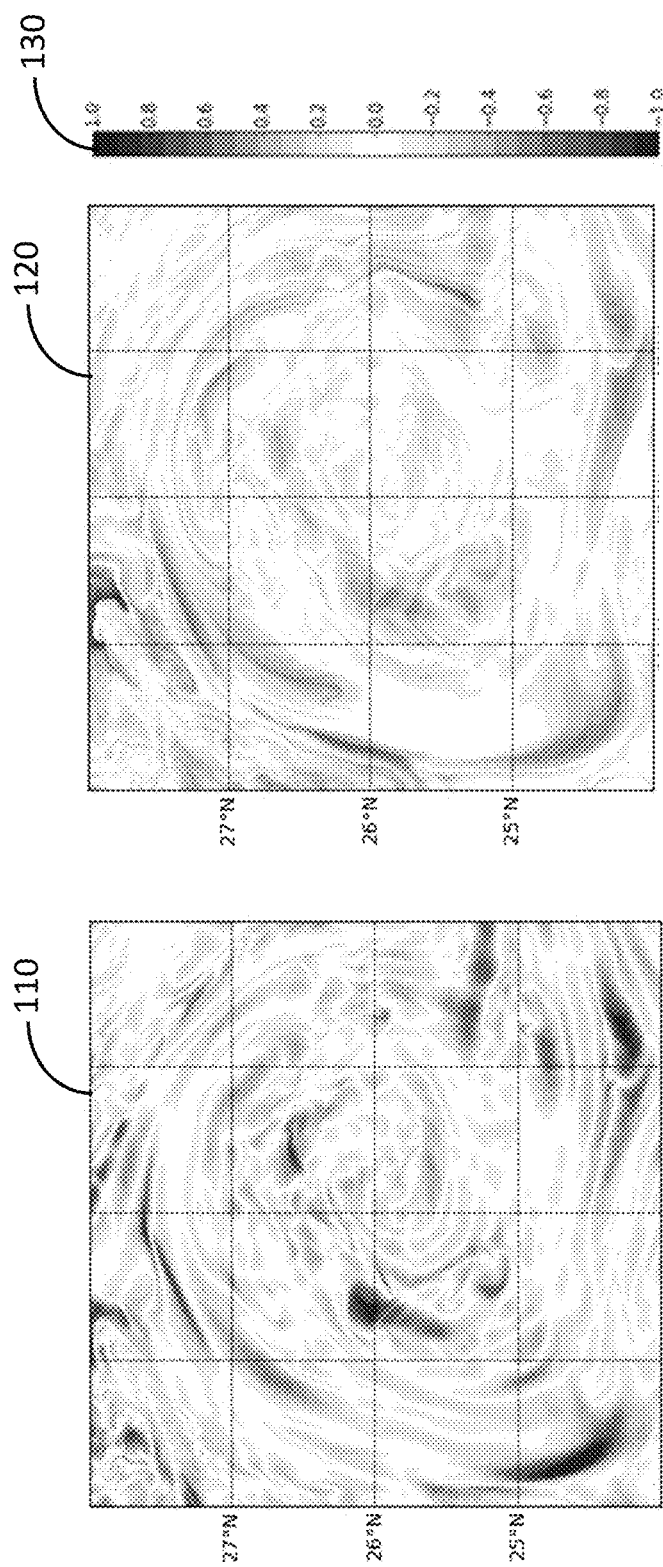
FIG. 1 includes color graphical representations of example dilation maps for indicating surface area and area density.

Embodiments of the invention use an ocean model forecast and also takes into account the tendency for the ocean surface currents to change the material area density (quantity of material per unit area). Locations of higher area density provide more efficient use of resources for gathering material. An ocean model forecast is used with the equations governing material deformation in two dimensions (across the ocean surface). This process leads to a dilation map. The dilation map provides the information on area density development of material into the future. Use of the dilation map to determine which material will be undergoing area density increase leads to directing resources to areas that increase efficiency.

The area density of material at an initial time is first specified as $\rho_o(X,Y)$, where the area density $\rho$ is indicated as a function of initial position (X,Y). The tendency for the ocean to change the area density is determined from the patch of the ocean located at (X,Y) at the initial time. The ratio of area of that patch at a later time t to the original area is specified by the dilation $\Delta(X,Y,t)$. Dilation may be computed from the deformation tensor.

Estimation of area change has been made by tracking triads of particles in numerical models. Finite separation between particles in areas of large shear such as around the Loop Current Eddy (LCE) and integration over long time can lead to difficulties in the estimation due to finite particle distribution. Therefore, we choose a path of directly integrating the deformation quantities. The velocity gradient tensor provides the quantities to compute Eulerian divergence and shear:

$$\nabla v = \begin{bmatrix} \frac{\partial u}{\partial x} & \frac{\partial u}{\partial y} \\ \frac{\partial v}{\partial x} & \frac{\partial v}{\partial y} \end{bmatrix} \quad (1)$$

where u and v are velocities in the x and y directions. A particle within the velocity field moves from an original position X (t=0) to a new position x (t=T). The material element deformation tensor is then $$F = \frac{\partial x}{\partial X} = \begin{bmatrix} \frac{\partial x}{\partial X} & \frac{\partial x}{\partial Y} \\ \frac{\partial y}{\partial X} & \frac{\partial y}{\partial Y} \end{bmatrix} \quad (2)$$

Deformation evolves with the tensor time derivative given by the product of the velocity gradient and F itself:

$$\frac{\partial F}{\partial t} = (\nabla v)F \quad (3)$$

When a material element is initially undeformed, F is the identity matrix. Thus, F can be computed for any particle by integrating equation (3) along a particle trajectory.

The total material deformation in two dimensions can be decomposed into three components: rotation, dilation (area change) and stretch (elongation along one axis and compensating contraction in the perpendicular direction without area change). Rotation is not of significant interest for our purposes. Dilation and stretch can be recovered from the singular value decomposition of F. Let $\lambda_1 \geq \lambda_2$ be the two singular values of F. Define dilation as $\Delta = \lambda_1 \lambda_2$. The dilation evolution equation may also be derived directly from equation (3) as:

$$\frac{1}{\Delta}\frac{D\Delta}{Dt} = \nabla \cdot v(x(t)) \qquad (4)$$

where $$\frac{D}{Dt}$$

is the total derivative along a material trajectory, $\Delta$ is the dilation and $\nabla \cdot v\ x(t))$ is the time series of divergence along the Lagrangian trajectory $x(t)$. If the divergence along the material trajectory is a constant D, the solution to (4) at time T is $\Delta=\exp(DT)$. Constant D leads to exponentially growing dilation, either increasing density or decreasing density depending on the sign.

An example of a dilation map is shown in FIG. 1. This is constructed using a numerical ocean model. The numerical model may be, for example, the Navy Coastal Ocean Model (NCOM). The domain for the demonstration here covers the entire Gulf of Mexico at 3 km horizontal resolution. The domain is forced by boundary conditions from the operational global HYCOM. The vertical grid uses 16 z-levels below 34 sigma-levels for a total of 50 levels. Sigma-levels cover the upper 550 m of the water column. The thinnest layer at the surface has a thickness of 0.5 m, and deeper layers telescope to the thickest sigma-layer of 85 m centered at a depth of 510 m. The high vertical resolution near the surface is intended to permit the representation of submesoscale physics. Atmospheric boundary conditions may be taken from, for example, the Coupled Ocean/Atmosphere Mesoscale Prediction System (COAMPS). The surface wind stress is determined from the atmospheric model wind velocity. Bulk flux formulations provide surface heat fluxes using the 10-m air-temperature and humidity along with the ocean model sea surface temperature (SST). Tidal potential forcing is applied to the interior of the domain, and tidal boundary conditions for water level and barotropic velocity are provided by the Oregon State University global Ocean Tide Inverse Solution (OTIS) at the domain boundaries. Thus, locally generated internal tides are present in the model.

Deformation evolution is computed by initializing a uniform distribution of particles with initial deformation equal to the identity matrix, integrating trajectories given model surface currents, computing velocity gradients at the particle positions over time and computing the deformation tensor for each particle according to equation (3). The initial particle positions cover the entire Gulf of Mexico domain at 1 km resolution. The period of integration is Jul. 20 through Aug. 10, 2012. The results of the dilation map are shown in FIG. 1, which includes a three day map 110 depicting surface area at three days after the initial particle positions and a ten day map 120 depicting surface area at ten days after the initial particle positions. In FIG. 1 and as shown in the surface area key 130, negative values indicate decreasing surface area and thus increasing area density, while positive values indicate increasing surface area and thus decreasing area density. The dilation map is plotted as $1/T^*\ln(\Delta)$. It is shown that persistent features of areas of increasing area density $(1/T^*\ln(\Delta)<0)$ occur.

Figure 2:
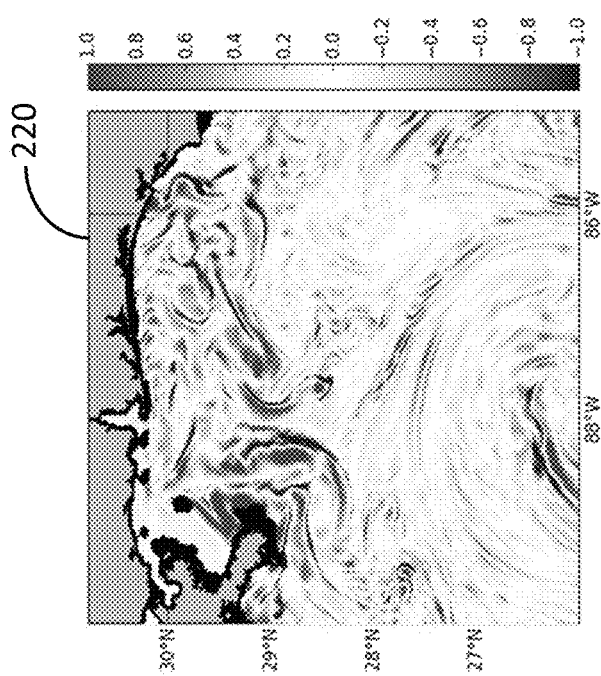
FIG. 2 is a color graphical representation of an example dilation map that shows materials 15 hours after initialization.
Figures 3A, 3B:
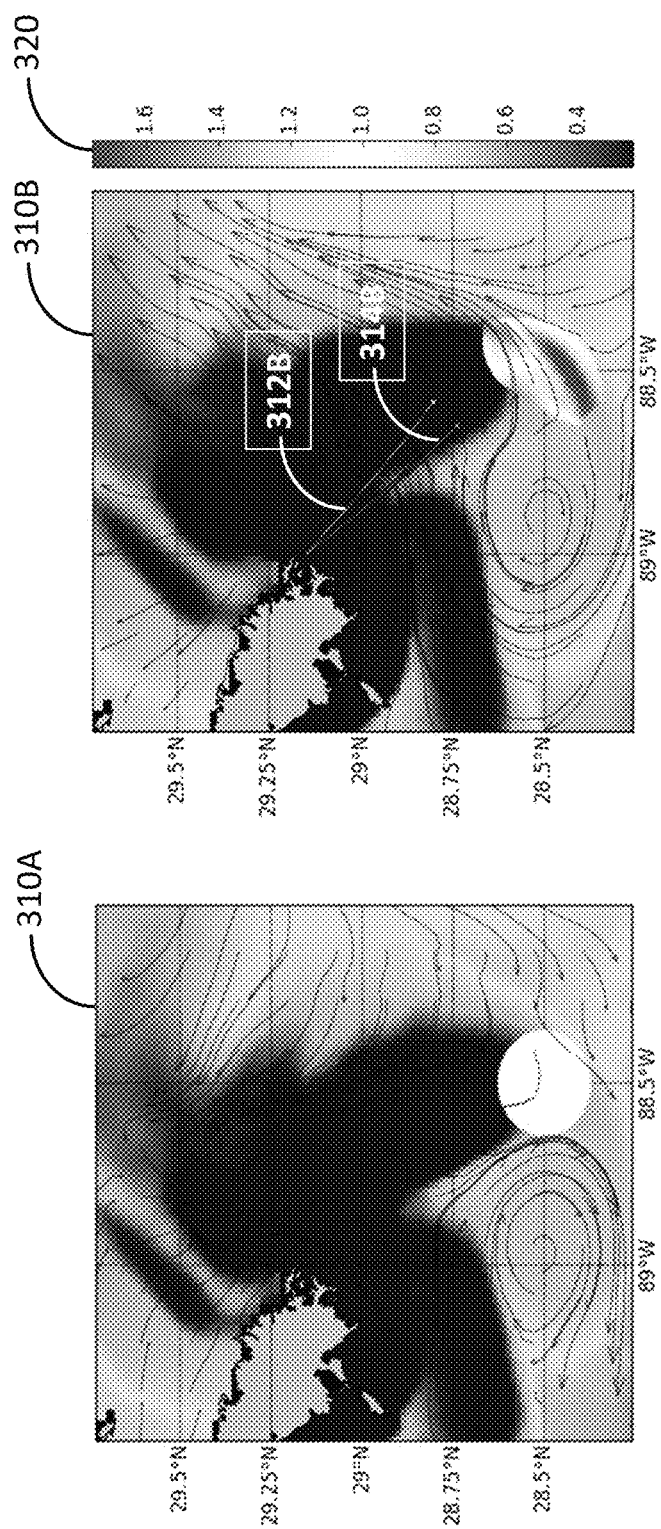
FIG. 3A is a color graphical representation of an example particle simulation that shows materials at initialization.
FIG. 3B is a color graphical representation of an example particle simulation that shows materials 15 hours after initialization.

An application of this is simulated in a small area of the model off the Mississippi River delta. To show the potential effectiveness of knowing the forecast development of area density, an area with significant dilation gradients is chosen. This is done by examining the dilation map 220 as shown in FIG. 2, which represents conditions 15 hours after the release of material on Jul. 20, 2012, 00Z. Based on this, an initial distribution of material is chosen to be centered at 88.5° W, 28.5° N as shown in FIG. 3A. This initial distribution is represented by a set of simulated particles placed with a uniform spacing of about 100 m in latitude and longitudes. All particles within 14 km of the chosen center point are retained in the simulation, which results in an initial circular distribution of material as shown in 310A of FIG. 3A.

Two ships on a mission to retrieve the material are then simulated. Each ship moves at 15 km/hour. The two ships start at the same location off the Mississippi River delta. Each ship has the same capability for gathering material, which is represented as sweeping a swath width as it travels at its fixed speed. One ship, which is shown as the red trajectory 314B in FIG. 3B, is not informed of the forecast dilation and thus area density change. Its trajectory is determined by the goal of collecting the material nearest to its current location. The premise is that it is minimizing transit time to collect material as soon as possible. The informed ship, which is shown as the orange trajectory 312B in FIG. 3B, is aware of the dilation and thus area density forecast. Its trajectory is determined by the goal of collecting material that is dense and nearby, thus considering both the evolving dilation and the distance to the material. It is heavily weighted toward targeting higher area density. At the time of FIG. 3B, the informed orange ship 312B can be seen to be moving toward the area of increased area density represented by the blue color within the area covered by the material. The uninformed red ship is moving toward the nearest material.

Figure 3C:
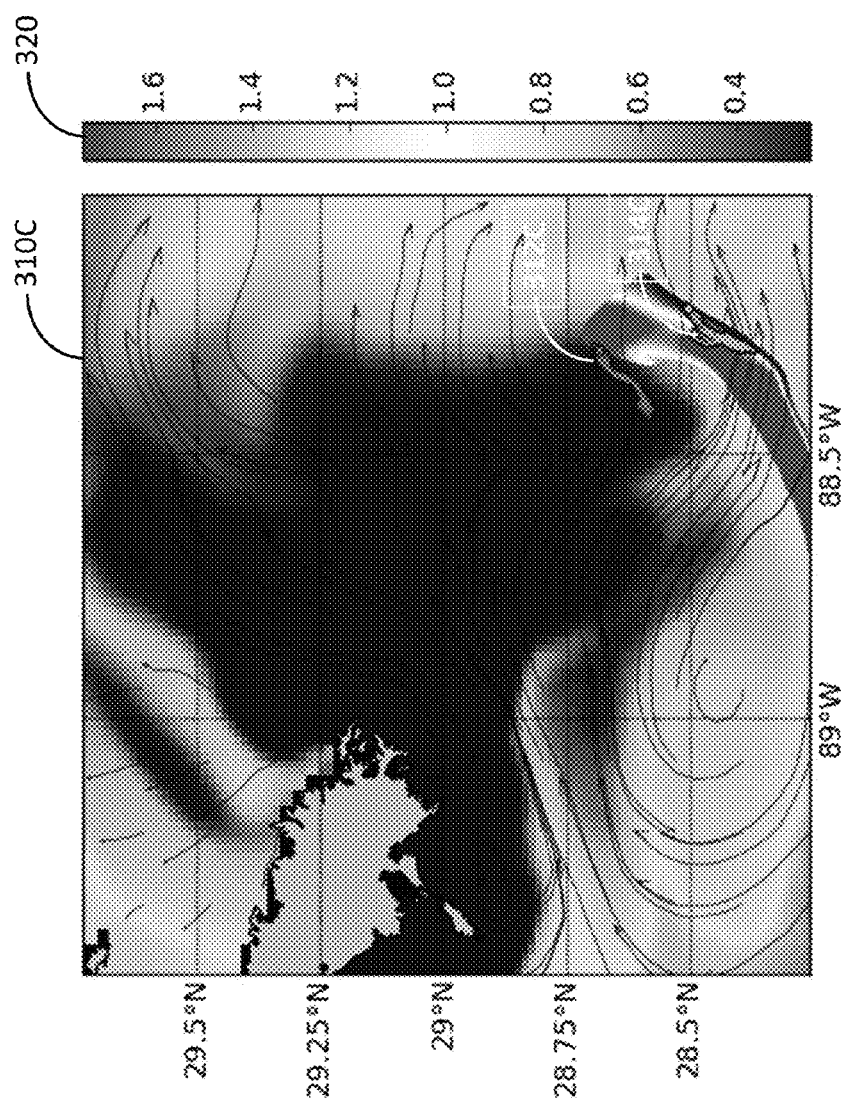
FIG. 3C is a color graphical representation of an example particle simulation that shows materials 40 hours after initialization.

The evolution of the material and its dilation are computed from equation 3. The evolution of ship tracks is prescribed by a behavior algorithm. Because the informed orange ship is aware of the forecast dilation and targets increased area density computed from the dilation, it continues to move toward the higher area density, while the red uniformed ship continues to gather material close to its location. The effect on the ship tracks is shown in FIG. 3C, along with the evolution of dilation within the material patch. In FIG. 3C, the material is colored by the dilation, where background color indicates ocean surface salinity and black vectors show the ocean surface currents at this time. The informed orange ship 312C is targeting higher area density material, while the red uninformed ship 314C continues to target material closest to its location.

Material collected by the ships is estimated as follows. The ship targets a particle based on its defined behavior. On reaching that particle, the time from the prior particle is computed. It is assumed the ship collects material over a fixed width swath during the transit time. The total material collected is the transit distance multiplied by the swath width multiplied by the material area density at the collected particle. It is assumed the material area density at the initial time is 1.0, and thus the material area density at collection time is 1/dilation. Once a particle is collected, it is removed from the available particles, and the ship behavior determines the next particle to target. The total material is accumulated over time.

Figure 4:
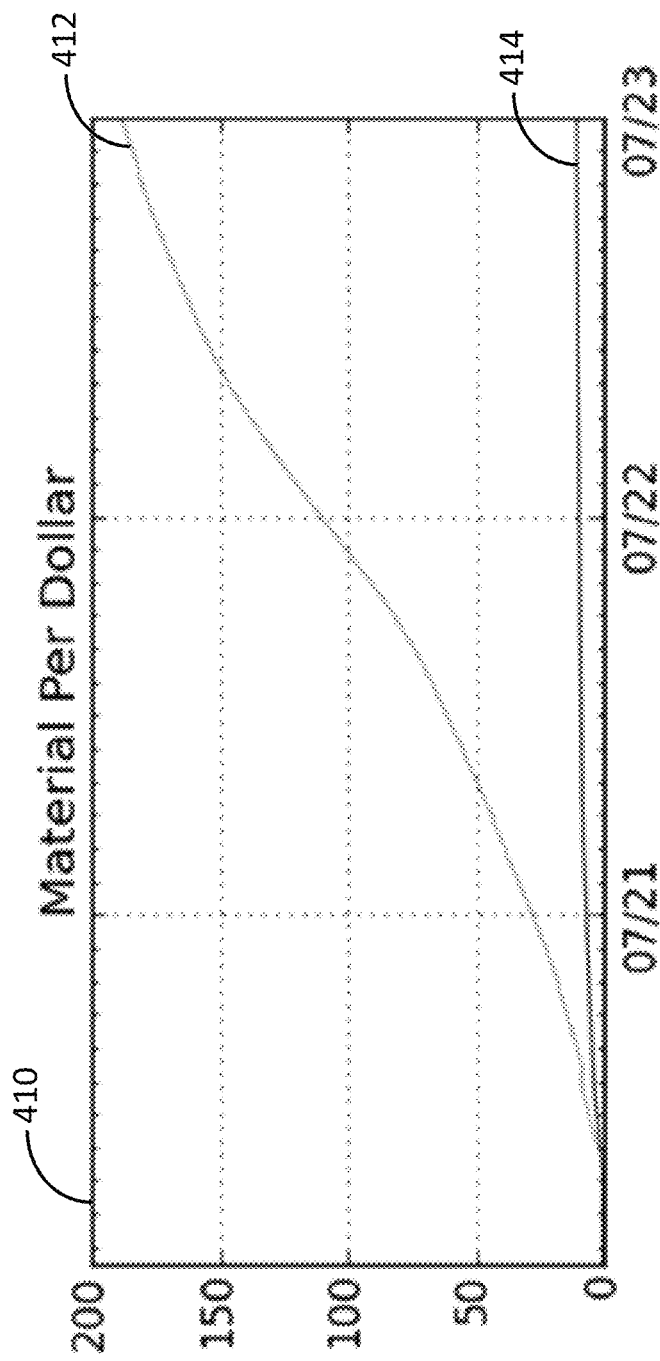
FIG. 4 is an example graph that compares the collection efficiency of an informed ship and an uninformed ship.

Efficiency is expressed as material collected per dollar. It is assumed the operational costs of the ships are identical and incurred at a constant rate over time. Because the initial material area density, collection swath width and ship operational costs per hour are fixed values, the efficiency can be expressed in non-dimensional units. The efficiency for each ship over the three days of simulation is shown in 410 of FIG. 4. The uninformed ship 414 is gathering material of relatively constant area density over time. Thus its efficiency in material per dollar is relatively constant once it begins gathering. The informed ship 412 is gathering material based on its area density. The area density is evolving over time as dilation continues to reduce surface area. Thus the informed ship 412 encounters continually increasing area density material. At the end of the 3-day simulation, the informed ship 412 has an efficiency that is roughly 20 times greater than the uniformed ship 414.

Figure 5:
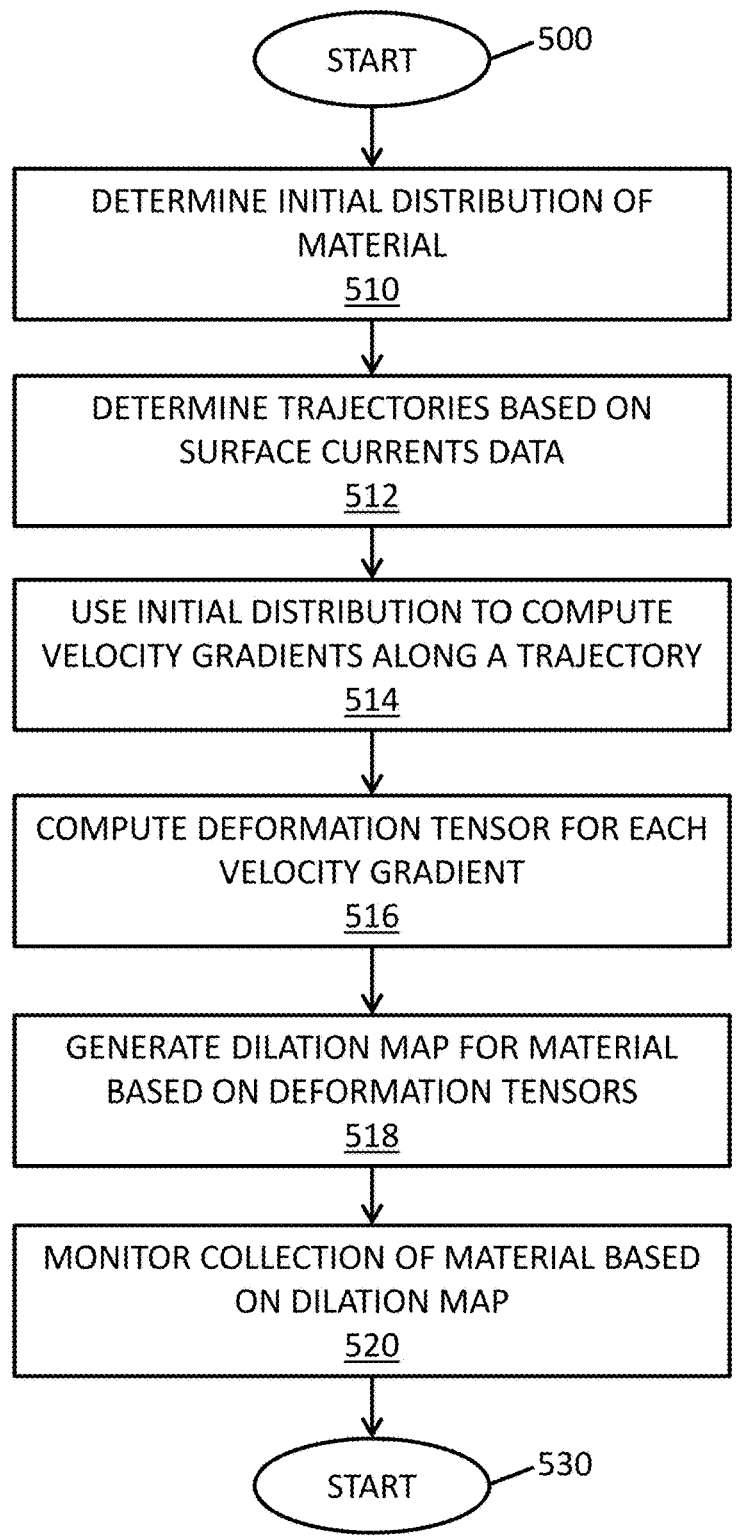
FIG. 5 is an example workflow for gathering materials on the ocean surface based on forecasting area density.

FIG. 5 an example workflow for gathering materials on the ocean surface based on forecasting area density. Examples of materials include debris, oil, wreckage, sensors, etc. As is the case with the other processes described herein, various embodiments may not include all of the steps described below, may include additional steps, and may sequence the steps differently. Accordingly, the specific arrangement of steps shown in FIG. 5 should not be construed as limiting the scope of gathering materials on the ocean surface based on forecasting area density.

In block 500, the method starts and proceeds to block 510, where the initial distribution of material is determined for a numerical ocean model. The initial distribution can be determined based on observed data such as satellite imagery, incident reports, sensor data, etc. In this example, the initial distribution determines the locations from which dilation will be computed according to equation (3). Further, dilation is computed by identifying particles in the numerical ocean model, and a deformation tensor is attached to each particle. This allows the evolution of deformation over the area of observed material to be forecasted.

In block 512, trajectories are determined based on surface currents data. For example, potential trajectories for the particles can be determined based on trajectory modeling of surface currents. In block 514, velocity gradients for each particle along the corresponding trajectory for each particle are computed.

In block 516, a deformation tensor is integrated over time for each of the particles. For example, the deformation tensor can be computed by using each velocity gradient to integrate equation (3) along the corresponding trajectory to compute the corresponding deformation tensor. The deformation tensor of a particle describes the dilation, stretch, stretch direction, and rotation that the material around the particle experiences as the particle moves along the corresponding trajectory. In block 518, a dilation map is generated for the particles based on the deformation tensors. Specifically, deformation tensors for the particles at a particular time step can be selected and then used to create a dilation map for the material. In block 520, the collection of material is monitored based on the dilation map. For example, the area density of collected material can be computed by monitoring the location of a recovery ship in the dilation map during collection, which can then be used to determine the efficiency of the collection. In this example, the location of the recovery ship can be determined using a global positioning system (GPS).

The workflow as described above allows for increased efficiency of gathering material from the ocean surface. The forecast dilation and area density allow changes in behavior that result in the improved efficiency. Without a forecast, operators have only the available in situ and remotely sensed information on which to base their behaviors. A trajectory forecast of the material without an accompanying material area density forecast provides only binary information, i.e. the presence or absence of the material. The area density forecast, however, provides additional information that can greatly improve the gathering efficiency.

Embodiments can include, for example, a computer-implemented method of gathering materials on the ocean surface based on forecasting area density. The computer-implemented method can perform a workflow such as the one described above with respect to FIG. 5. A person having ordinary skill in the art will recognize that various types of memory are readable by a computer such as described herein. In addition to that described above the computer readable media, or memory, for each includes but is not limited to: nonvolatile, hard-coded type media such as read only memories (ROMs), CD-ROMs, and DVD-ROMs, or erasable, electrically programmable read only memories (EEPROMs), recordable type media such as floppy disks, CD-R/RWs, DVD-RAMs, DVD-R/RWs, DVD+R/RWs, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at multiple and/or remote locations.

The invention claimed is:

1. A method for gathering materials on an ocean surface, comprising:
   determining, using a computer processor, an initial distribution of material based on observational sources;
   representing the material by a plurality of particles in a numerical ocean model; determining a plurality of trajectories for the numerical ocean model based on modeled surface currents data;
   computing a plurality of velocity gradients along a corresponding trajectory of the plurality of trajectories for each of the plurality of particles based on the initial distribution;
   computing a plurality of deformation tensors for each of the plurality of particles based on the plurality of velocity gradients;
   determining a dilation for each of the plurality of deformation tensors based on a divergence from a corresponding local velocity gradient of the plurality of velocity gradients of a corresponding particle of the plurality of particles, wherein the dilation is determined according to:

$$\frac{1}{\Delta}\frac{D\Delta}{Dt} = \nabla \cdot v(x(t)),$$

and
wherein $$\frac{D}{Dt}$$

is a total derivative along a material trajectory, $\Delta$ is the dilation, and $\nabla \cdot v(x(t))$ is a time series of divergence along the corresponding trajectory $x(t)$;
   generating a dilation map for the plurality of particles based on the dilation of a time step tensor of the plurality of deformation tensors for each of the plurality of particles;

using the dilation map to identify a target area with a higher area density;
create a recovery path that navigates a recovery ship through the target area; and
monitoring collection of the plurality of particles based on the dilation map.

2. The method of claim 1, wherein the dilation map shows an area density of the material as represented by the plurality of particles rendered in a geographic area.

3. The method of claim 1, wherein the plurality of deformation tensors is determined based on the plurality of velocity gradients using:

$$\frac{\partial F}{\partial t} = (\nabla v)F$$

wherein $\nabla v$ is a velocity gradient of the plurality of velocity gradients and F is an original deformation tensor of the plurality of deformation tensors for a particle of the plurality of particles at a specified time step, and wherein a next deformation tensor of the plurality of deformation tensors at a subsequent time step is determined by integrating the product of the velocity gradient and the original deformation tensor.

4. A non-transitory computer readable medium having computer-executable program instructions embodied therein that when executed cause a computer processor to:
determine an initial distribution of material based on observational sources;
represent the material by a plurality of particles in a numerical ocean model;
determine a plurality of trajectories for the numerical ocean model based on modeled surface currents data;
compute a plurality of velocity gradients along a corresponding trajectory of the plurality of trajectories for each of the plurality of particles based on the initial distribution;
compute a plurality of deformation tensors for each of the plurality of particles based on the plurality of velocity gradients;
determine a dilation for each of the plurality of deformation tensors based on a divergence from a corresponding local velocity gradient of the plurality of velocity gradients of a corresponding particle of the plurality of particles, wherein the dilation is determined according to:

$$\frac{1}{\Delta}\frac{D\Delta}{Dt} = \nabla \cdot v(x(t)),$$

and
wherein $$\frac{D}{Dt}$$

is a total derivative along a material trajectory, $\Delta$ is the dilation, and $\nabla \cdot v(x(t))$ is a time series of divergence along the corresponding trajectory $x(t)$;
generate a dilation map for the plurality of particles based on the dilation of a time step tensor of the plurality of deformation tensor for each of the plurality of particles;
use the dilation map to identify a target area with a higher area density;
create a recovery path that navigates a recovery ship through the target area; and
use a global positioning system to monitor collection of the material by the recovery ship.

5. The non-transitory computer readable medium of claim 4, wherein the dilation map shows an area density of the material as represented by the plurality of particles rendered in a geographic area.

6. The non-transitory computer readable medium of claim 4, wherein the plurality of deformation tensors is determined based on the plurality of velocity gradients using:

$$\frac{\partial F}{\partial t} = (\nabla v)F$$

wherein $\nabla v$ is a velocity gradient of the plurality of velocity gradients and F is an original deformation tensor of the plurality of deformation tensors for a particle of the plurality of particles at a specified time step, and wherein a next deformation tensor of the plurality of deformation tensors at a subsequent time step is determined by integrating the product of the velocity gradient and the original deformation tensor.

7. A system comprising:
a memory to store program code for gathering materials on an ocean surface;
a global positioning system to determine a location of a recovery ship; and
a computer processor operatively connected to the memory to:
determine an initial distribution of material based on observational sources;
represent the material by a plurality of particles in a numerical ocean model;
determine a plurality of trajectories for the numerical ocean model based on modeled surface currents data;
compute a plurality of velocity gradients along a corresponding trajectory of the plurality of trajectories for each of the plurality of particles based on the initial distribution;
compute a plurality of deformation tensors for each of the plurality of particles based on the plurality of velocity gradient;
determine a dilation for each of the plurality of deformation tensors based on a divergence from a corresponding local velocity gradient of the plurality of velocity gradients of a corresponding particle of the plurality of particles, wherein the dilation is determined according to:

$$\frac{1}{\Delta}\frac{D\Delta}{Dt} = \nabla \cdot v(x(t)),$$

and
wherein $$\frac{D}{Dt}$$

is a total derivative along a material trajectory, $\Delta$ is the dilation, and $\nabla \cdot v(x(t))$ is a time series of divergence along the corresponding trajectory $x(t)$;

generate a dilation map for the plurality of particles based on the dilation of a time step tensor of the plurality of deformation tensor for each of the plurality of particles;

use the dilation map to identify a target area with a higher area density;

create a recovery path that navigates a recovery ship through the target area; and use the global positioning system to monitor collection of the material by the recovery ship.

8. The system of claim 7, wherein the dilation map shows an area density of the material as represented by the plurality of particles rendered in a geographic area.

9. The system of claim 7, wherein the plurality of deformation tensors is determined based on the plurality of velocity gradients using:

$$\frac{\partial F}{\partial t} = (\nabla v)F$$

wherein $\nabla v$ is a velocity gradient of the plurality of velocity gradients and F is an original deformation tensor of the plurality of deformation tensors for a particle of the plurality of particles at a specified time step, and wherein a next deformation tensor of the plurality of deformation tensors at a subsequent time step is determined by integrating the product of the velocity gradient and the original deformation tensor.

* * * * *